US006311828B1

(12) United States Patent
Newnes et al.

(10) Patent No.: US 6,311,828 B1

(45) Date of Patent: Nov. 6, 2001

(54) STEPPED POSITIONING FENCE

(75) Inventors: William R. Newnes; Geoff Wight, both of Salmon Arm (CA)

(73) Assignee: CAE Inc., Toronto (CA)

( * ) Notice: Subject to any disclaimer, the term of this patent is extended or adjusted under 35 U.S.C. 154(b) by 0 days.

(21) Appl. No.: 09/336,682

(22) Filed: Jun. 21, 1999

(30) Foreign Application Priority Data

Jun. 22, 1998 (CA) ................................................ 2241481

(51) Int. Cl.[7] ................................................ B65G 47/26

(52) U.S. Cl. ............................ 198/456; 83/75.5; 83/409; 83/419; 83/422; 83/425.2; 83/732

(58) Field of Search ................................ 83/72, 74, 75.5, 83/331, 360, 365, 418, 419, 420, 425.2, 425.3, 438, 732; 198/456; 144/245.1

(56) References Cited

U.S. PATENT DOCUMENTS 4,023,605 * 5/1977 Hellstrom et al. ................... 144/312
4,507,998 * 4/1985 Lambert et al. ....................... 83/419
5,174,351 * 12/1992 Lindenblatt et al. ................ 144/356
5,368,080 * 11/1994 Hamel ................................. 144/357
5,381,712 * 1/1995 Head, Jr. et al. ...................... 83/418
5,544,558 * 8/1996 Hughes ................................ 83/75.5
5,853,038 * 12/1998 Newnes ............................... 144/357
5,865,080 * 2/1999 Jackson .................................. 83/74
5,911,302 * 6/1999 Jackson ............................... 198/456
5,916,354 * 6/1999 Dragt .................................... 83/536
5,921,162 * 7/1999 Jackson et al. ....................... 83/829

* cited by examiner

*Primary Examiner*—Rinaldi I. Rada
*Assistant Examiner*—Kim Ngoc Tran
(74) *Attorney, Agent, or Firm*—Anthony C. Edwards

(57) ABSTRACT

A board positioning device selectively positions in a lateral direction in a generally horizontal plane a board translating in a longitudinal direction in the horizontal plane, wherein the board is aligned along its length in the lateral direction. The device includes a stepped fence, which may be selectively positionable, lying generally in the horizontal plane. A fence positioner cylinder may selectively position the stepped fence in the lateral direction in the horizontal plane so as to position one step of a plurality of steps on the fence to correspond to a desired transition path so as to position the end of the board at a board optimizing position as determined by an optimizer, whereby the board may be laterally, selectively positioned into an optimized position relative to trimmer saws located downstream from the stepped fence in the longitudinal direction when the board is urged laterally against the stepped fence by ending rolls.

9 Claims, 10 Drawing Sheets

STEPPED POSITIONING FENCE

FIELD OF THE INVENTION

This invention relates to a positioning fence, and in particular to an automatically adjustable stepped board positioning fence.

BACKGROUND OF THE INVENTION

In a typical lumber mill or planer mill, each board is moved along sideways. That is, oriented transversely on a lugged transfer prior to trimming or sorting. Typically, the lugs on the transfer are evenly spaced at precise intervals. Moving boards through an electronic scanner by the lugged transfer, the scanner determines the shape and/or length of each board and sends the information to an optimizer. The optimizer in turn sends the information to a controller. The controller activates saws above a trimer saw deck to trim the board in the corresponding lug space, in an attempt to maximize board utilization.

Typically, however, saws are spaced about two feet apart, so that depending upon the physical defects of a board, up to almost two feet on each end of the board can be trimmed and thus wasted, which can result in a considerable wastage of useful wood.

In order to minimize such wastage, in the prior art, board positioners have been developed which utilize a plurality of parallel rollers that are driven in a direction perpendicular to the transfer deck, thus moving the ends of the boards against a positioning fence. When on the rollers, the boards are continually thrust laterally across the transfer deck. The boards are elevated out of contact with the rollers at a predetermined time. Such devices suffer from the fact that tapered ends of the boards abutting the positioning fence can be so structurally weak as to collapse or break when driven against the fence by the rollers. Because the board has been optimized based on the inclusion of the tapered ends, if one end of the board is broken off, the optimized positioning of the board is adversely affected as the broken board is driven against the positioning fence, resulting in a board that is trimmed non-optimally.

Thus, it is the object of the present invention to provide a board positioning device which can accurately position selected boards lengthwise, and process the boards through the trimmer at a higher rate of speed than prior art devices, without collapse of the board's weak ends, to thus provide an improvement in maintaining a consistently accurate and optimally trimmed board.

Further, if the board is translated laterally by the rollers more than a small distance before the board contacts the positioning fence, the lateral velocity and acceleration of the board will often result in the board bouncing off the positioning fence. This also causes loss of accuracy in optimizing positioning of the board for trimming the optimizer and controller regulating the lateral optimized positioning of the board relative to the saws is based on the assumption that the board is ended closely against the positioning fence.

Thus, it is an object of the present invention to provide a board positioning device which can accurately position selected boards lengthwise, that is, transversely across the transfer deck and process the boards through the trimmer at a higher rate of speed than prior art devices. Controlled ending substantially reduces board bounce, and/or collapse of the board's weak ends, thus providing an improvement in maintaining a consistently accurate and optimally trimmed board.

It is yet another object of the present invention, to provide a stepped fence board positioning device for sorting of boards by length or grade.

SUMMARY OF THE INVENTION

A stepped board positioning fence has a plurality of rigid elevated steps extending longitudinally along the fence in an adjacent stepped array, mounted upstream of a trimmer in the direction of flow. Alternatively the fence is mounted upstream of sorter bins or the like when using fixed stepped fence in an alternative embodiment. The boards are translated on lugged transfer chains, and simultaneously translated over a plurality of ending rolls. The ending rolls are mounted parallel to the lugged transfer chains. The boards are perpendicular to the transfer chains and ending rolls.

The ending rolls end the boards against the stepped fence. At the upstream end of the stepped fence, the boards are urged laterally (i.e. ended) against a selectively pivotable positioner which is pivoted by selective actuation of a multistage cylinder (or other means). The positioner directs boards along one of the laterally spaced apart travel paths defined by the steps on the stepped fence.

Alternatively, a short ending roll is mounted adjacent the upstream end of the stepped fence. The short ending roll is selectively elevated from below the level of the boards on the ending rolls when needed to boost a board on a step required for that board's particular ending requirements.

The boards are continually urged against the fence as they are translated both towards the fence and simultaneously towards the trimmer saws. The steps have fixed profiles which define progressively diverging travel paths diverging in the downstream direction. The step profiles straighten so that the travel paths become parallel near the end of the fence. As the board reaches the downstream end of the ending rolls and the stepped fence (that is, just before clearing the fence), the fence is accurately adjusted by a Temposonic™-type selectively actuable cylinder (or other means) to accurately set the board's position. The end of the board then slides off the end of the fence and translates in direction A into the saw blades.

An optional flexible overhead hold down device, or other hold down means, is made of a smooth and flexible material such as UHMW plastic. The flexible overhead hold down device presses boards down onto the ending rolls to help insure traction of the board on the ending rolls, as well as helping to prevent chattering of the board after the board reaches its ending point against the fence. Chattering can cause the board to be out of position slightly as the board comes off the downstream ends of the ending rolls.

The present invention allows boards to follow along the fence at all times, inhibiting bouncing of the boards off the fence and helps to prevent the breaking off, and loss of a structurally weak end of the board. Both bouncing and breaking of boards may cause missed target points on the board which have been set by the optimizer as sawing points based both on a scanned board profile, that is, based on a profile which included the structurally weak end of the board.

In summary, the board positioning device of the present invention is a device for selectively positioning in a lateral direction in a generally horizontal plane a board translating on a board transfer. The board is transferred in a longitudinal direction in the horizontal plane. The board is aligned along its length in the lateral direction and urged in the lateral direction by board ending means. The board positioning device includes a stepped fence lying in the generally horizontal plane. The stepped fence has a plurality of adjacent terraced steps extending downstream in a generally spaced array from an upstream stepped fence entrance. The steps extend downstream in generally the longitudinal direction from an upstream stepped fence entrance whereat the board may be slid onto one step of the plurality of adjacent terraced steps. Each step of the plurality of adjacent terraced steps defines a corresponding transition path for transitioning an end of the board from the upstream stepped fence entrance to a downstream position. A selective positioning means selectively positions the end of the board onto a desired step of the plurality of adjacent terraced steps at the upstream stepped fence entrance so as to correctly position the end of the board at the downstream position.

Advantageously, the selective positioning of the end of the board onto a desired step is in accordance with instructions from an optimizer. The downstream position is thus an optimized board ending position optimized relative to at least one trimmer saw downstream of the stepped fence. The stepped fence is selectively positionable so as to position one step of the plurality of adjacent terraced steps and the corresponding transition path so as to accurately optimize the optimized board ending position. The board may be thereby laterally, selectively positioned into an optimized position relative to the at least one trimmer saw when the board is urged laterally against the stepped fence by the board ending means.

Further advantageously, the stepped fence is selectively positionable by means of a pivot mount on the stepped fence at an upstream end thereof, and the stepped fence selectively pivotable about the pivot mount by means of a selective actuator mounted to the stepped fence at a position downstream of the pivot mount.

In one aspect of the present invention, the spaced array of terraced steps on the stepped fence are generally radially spaced apart about the stepped fence entrance.

In another aspect, the board positioning device also includes a flexible overhead hold down. The overhead hold down may be an elongate member lying in a generally horizontal plane and pivotally mounted on parallelogram linkage members to rigid overhead supporting members mounted over the ending rolls. The elongate member pivots under its own weight on the parallelogram linkage into downwardly compressive engagement with the board whereby the board is held down onto the board transfer by the elongate member.

Advantageously, the elongate member is skewed in the generally horizontal plane relative to the lateral direction. In particular, an upstream end of the elongate member, upstream in the longitudinal direction of translation of the boards, is positioned a greater lateral distance from the stepped fence than a downstream end of the elongate member. In conjunction with the board ending means, the board is thus urged against the stepped fence as the board is translated longitudinally downstream.

Further advantageously, the elongate member is ski-shaped so as to have an upwardly curved tip at its upstream end, whereby the elongate member may ride up onto the board as the board is translated longitudinally downstream on the board transfer.

In an alternative embodiment, the stepped fence is used for sorting boards by board length or grade. The boards are directed to the appropriate step on the stepped fence by an elevating roller, thus directing the board to the corresponding sorter bin, stacker, or for a re-manufacturing site, by a simple fixed stepped fence, which needs no accurate positioning.

BRIEF DESCRIPTION OF THE DRAWINGS

The invention will be better understood by reference to the accompanying drawings, wherein.

DETAILED DESCRIPTION OF THE PREFERRED EMBODIMENT

Figure 1:
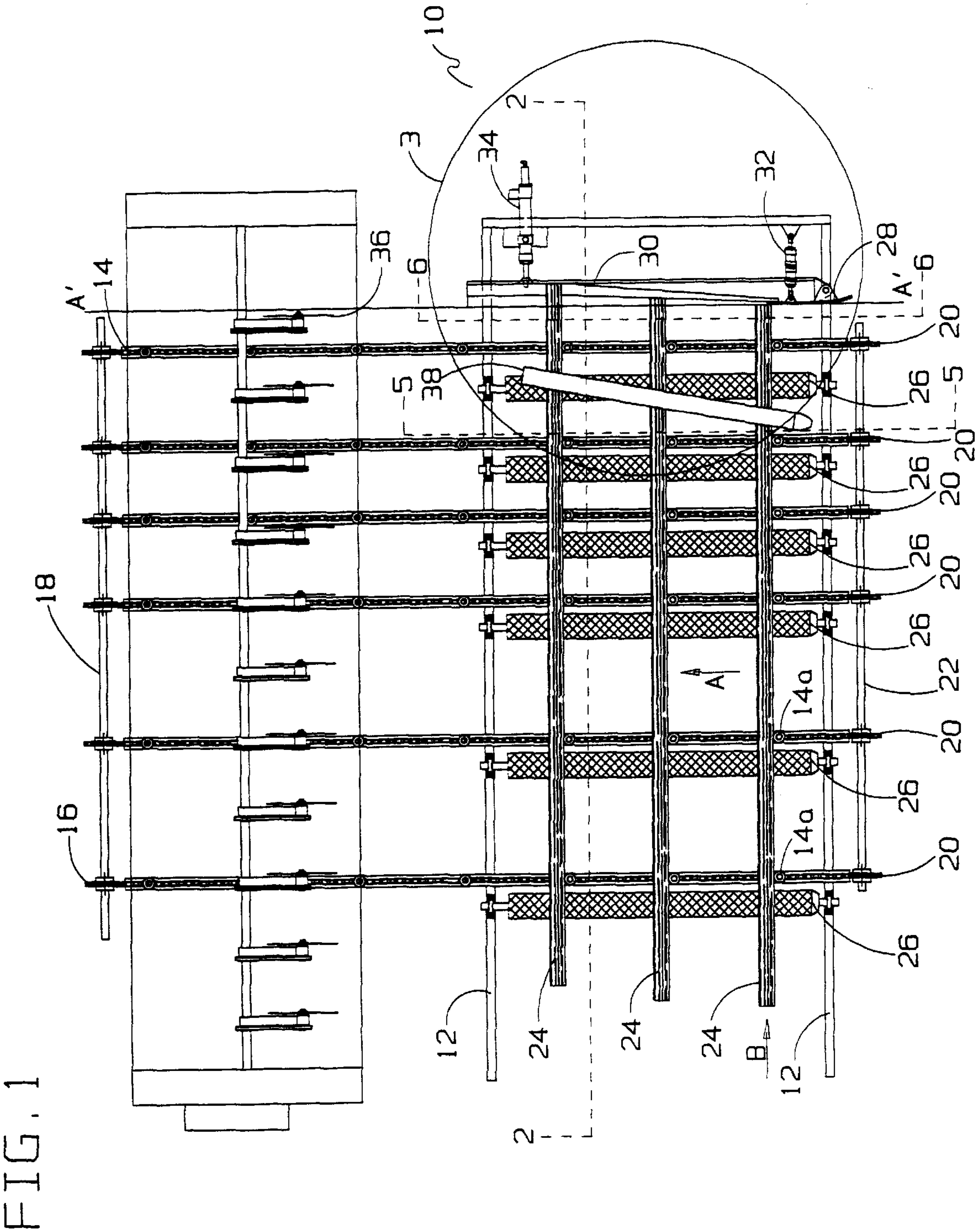
FIG. 1 is a plan view according to a preferred embodiment of the board positioning device of the present invention.
Figure 2:
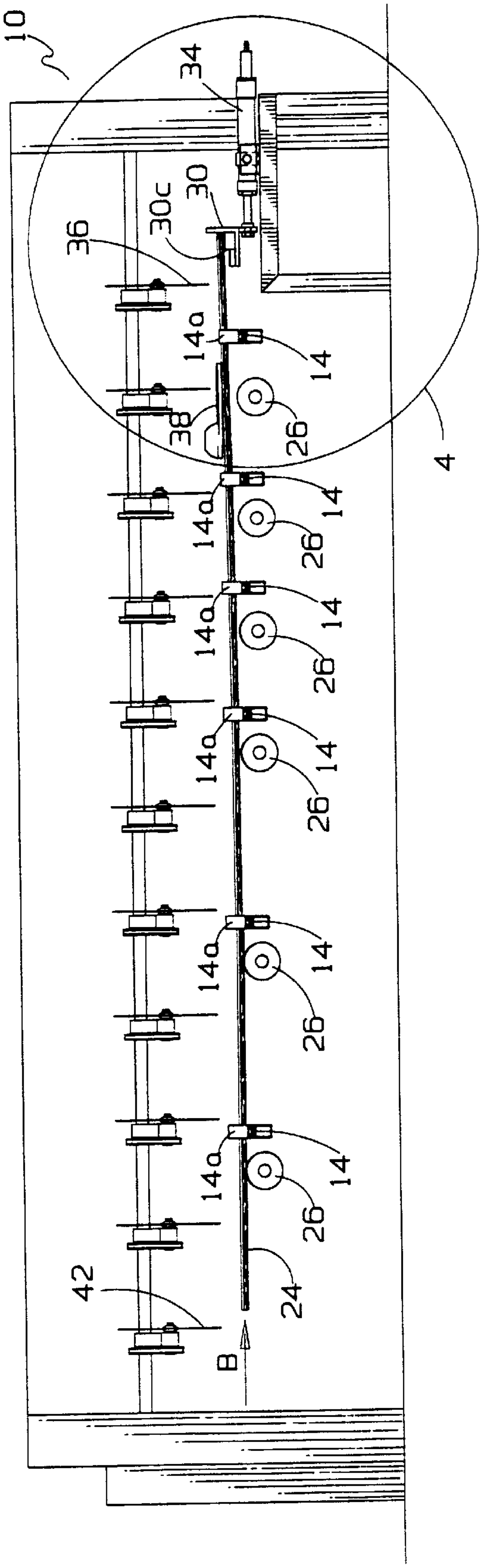
FIG. 2 is a cross-sectional view along section line 2—2 in FIG. 1.

Referring to the drawing figures wherein similar characters of reference represent corresponding parts in each of several views, the apparatus of the present invention is generally indicated by the reference numeral 10.

As best seen in FIG. 1, in the preferred embodiment, apparatus 10 includes a support frame constructed of various vertical and horizontal structural supports 12, a plurality of lugged transfer chains 14 mounted, at their upstream end, on transfer chain sprockets 16. Drive sprockets 16 are mounted on transfer chain drive shaft 18. Lugged transfer chains 14 are mounted at their downstream end on transfer chain idler sprockets 20. Idler sprockets 20 are mounted on transfer chain idler shaft 22. Transfer chains 14 transfer boards 24 over ending rolls 26 in direction A. Ending rolls 26 rotate so as to urge boards 24 in direction B.

Figure 3:
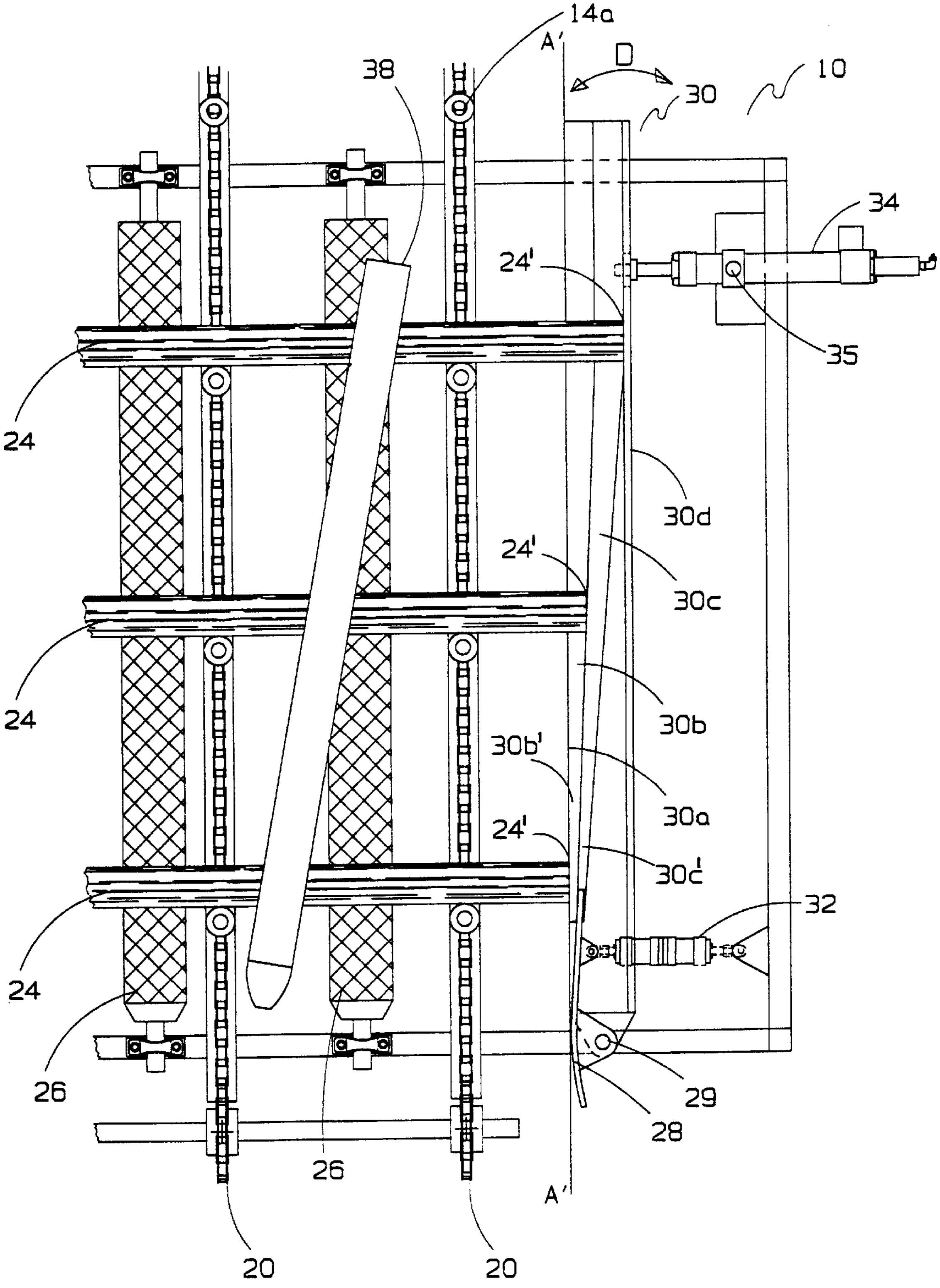
FIG. 3 is an enlarged, fragmentary view of the board positioning device of FIG. 1.
Figure 3A:
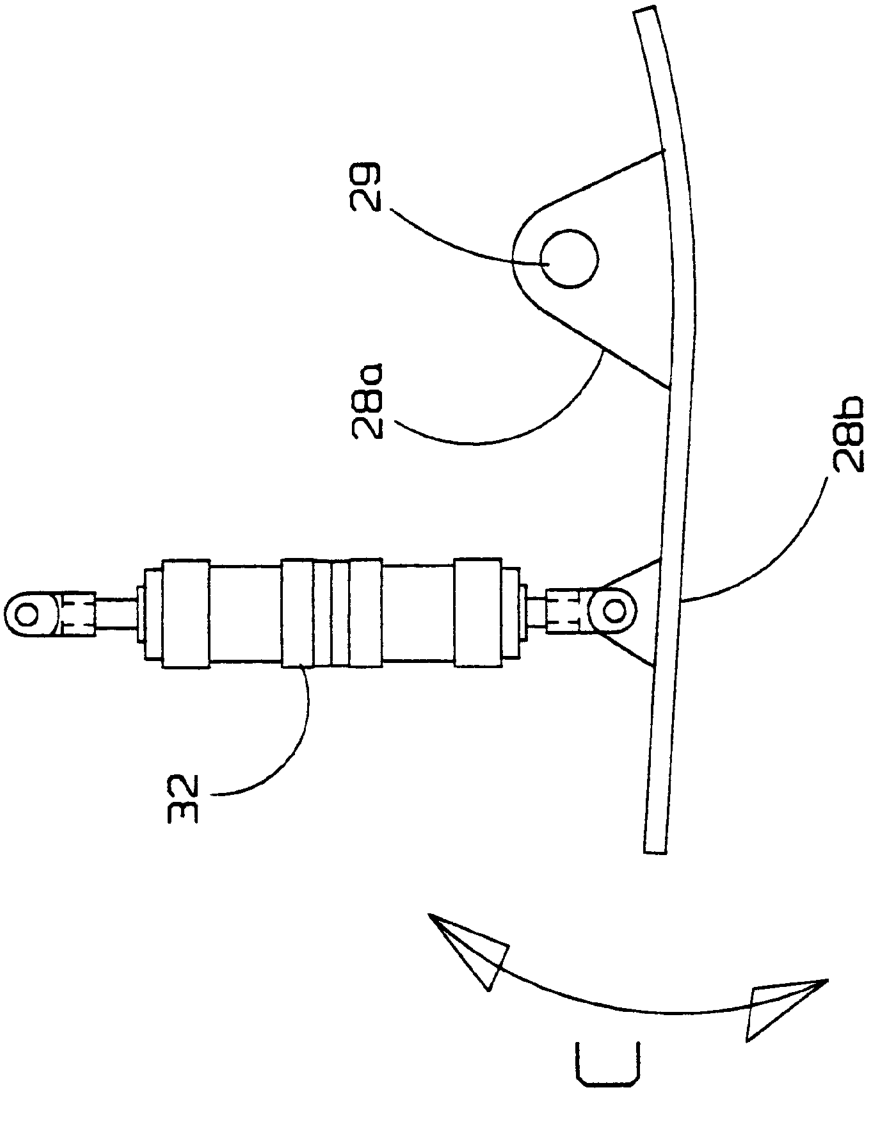
FIG. 3*a* is an enlarged view of the board positioner of FIG. 3.
Figure 3B:
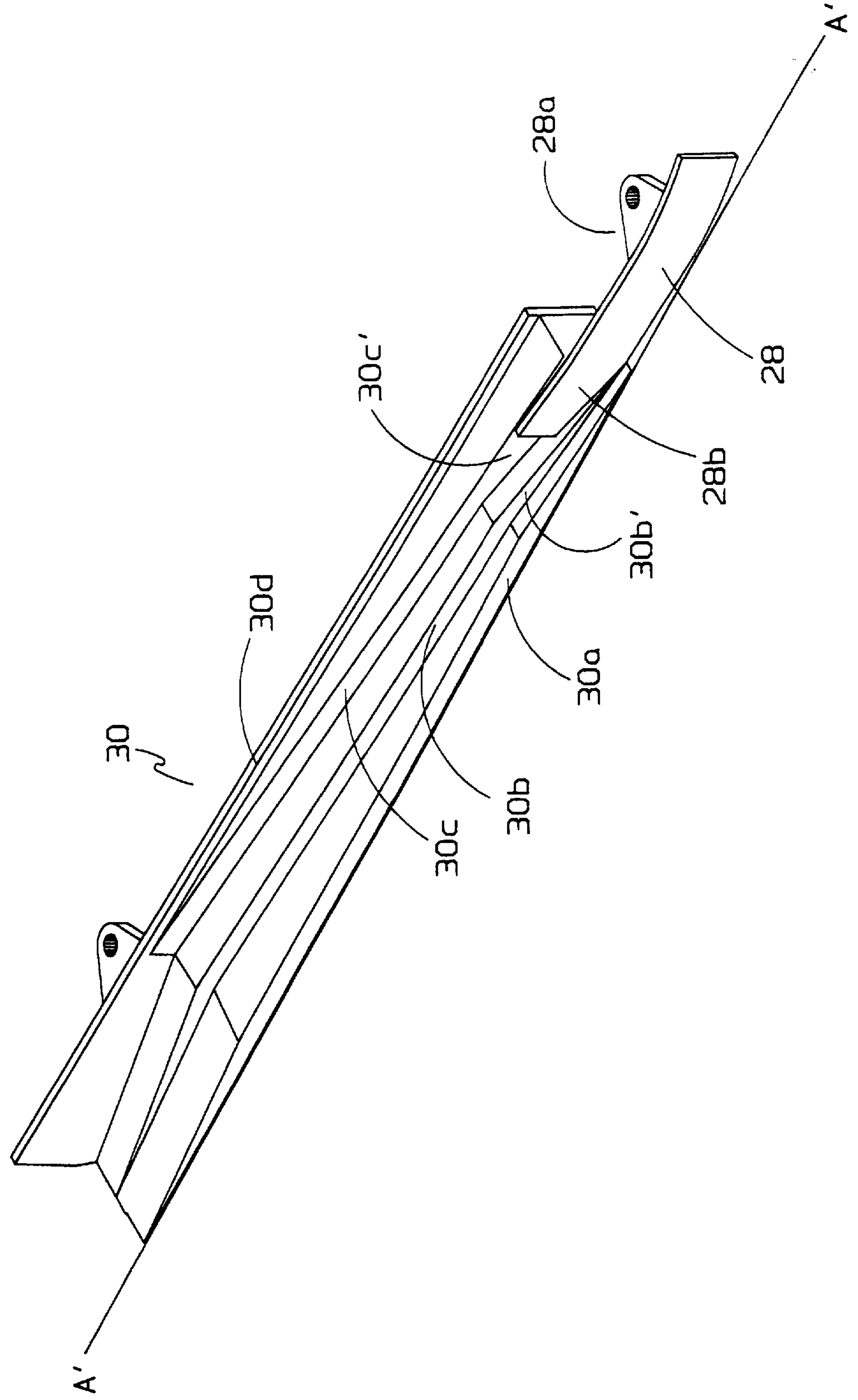
FIG. 3*b* is, in perspective view, the stepped fence of the board positioning device of the present invention.
Figure 4:
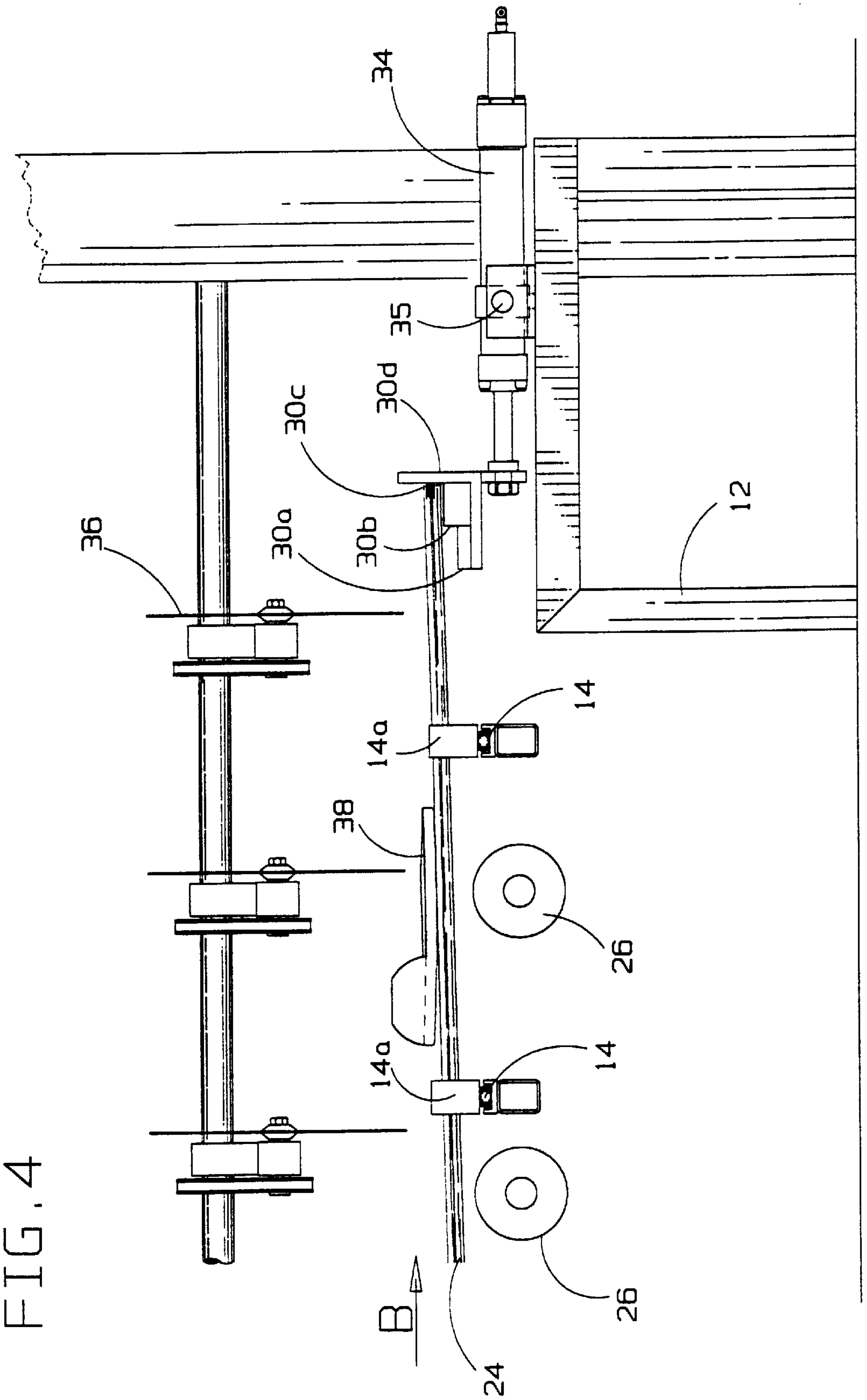
FIG. 4 is an enlarged, fragmentary, side sectional view of the board positioning device of FIG. 2.

A board positioner 28, best seen in FIGS. 3 and 3*a*, directs a board 24 to one of fence steps 30*b*, or 30*c* on stepped fence 30 better seen in FIG. 3*b*. Positioner 28 may be a curved generally rectangular plate. Positioner 28 is mounted on edge by means of pivot arms 28*a*. Pivot arms 28*a* are rigidly mounted to positioner 28 so as to extend generally perpendicularly therefrom. Pivot arm 28*a* pivotally mounts positioner 28 on pin 29. Positioner 28 may, as seen in FIG. 3*b*, extend downstream in direction A so as to overlap the upstream ends of steps 30*a* and 30*b* on stepped fence 30. Pin 29 is rigidly mounted to structural supports 12. The positioner 28 is selectively pivotable in direction C about pin 29 by selective actuation of multi-stage cylinder 32. Cylinder 32 is pivotally mounted between positioner 28 and structural supports 12.

Stepped fence 30 is also pivotally mounted, at its upstream end, to pin 29. Stepped fence 30 has terraced steps 30*b* and 30*c* rigidly extending generally horizontally outwardly of a generally rectangular back plate 30*d* lying in a vertical plane. Cylinder 34 is rigidly mounted at one end to back plate 30*d*, its other end being mounted in a pivot 35, that is mounted to structural supports 12 so as to have two degrees of rotational freedom. Thus as stepped fence 30 is pivoted in direction D about pin 29 by actuation of cylinder 34, cylinder 34 also correspondingly pivots in pivot 35. If board 24 is to be positioned so that its end 24' is spaced only a short distance in direction B relative to line A'—A', or is to be positioned so that its end 24' is aligned along line A'—A', then positioner 28 is not pivoted and board 24 will follow along a lowermost first face 30*a* of stepped fence 30 so as to be accurately positioned by first face 30*a*. Accurate positioning of board 24 is done by selective actuation of positioning cylinder 34. Stepped fence 30 is pivoted so as to be adjusted precisely to position board 24 for saws 36 as board 24 reaches the end of stepped fence 30. At that time board 24 has already passed over ending rolls 26, so that board 24 then continues in direction A to be trimmed by saws 36.

If the desired spacing of board end 24' relative to line A'—A' is such that board end 24' needs to be positioned against one of fence steps 30*b* or 30*c* then positioner 28 is actuated to direct board end 24' to the appropriate step. The appropriate step is determined according to the initial offset or rough positioning required for appropriate positioning of end 24' of board 24. The accuracy of the desired position may not require fine-tuning of the position of end 24' by actuation of the Temposonic™ cylinder 34 or may not require a Temposonic™ cylinder 34 at all. Thus, for example, if the width of steps 30*b* and 30*c* is 2 inches, and the required trimming accuracy is in the order of 2 inches, then cylinder 34 is not required at all. If the desired trimming accuracy is approximately ¼ inch, then fine-tuning of the ending position is required, once the board end 24' is placed on the step corresponding to the desired position, to accurately fine-tune the board end position prior to the board entering the saws. If the appropriate step is 30*b,* then positioner 28 is pivoted to align surface 28*b* of positioner 28 with step 30*b,* (the second vertical face), at the entrance end 30*b*' to step 30*b*. Thus the board end 24' of a board 24 moving in direction A, urged in direction B, will slide over surface 28*b* and transition onto and along step 30*b,* sliding along the vertical wall so as to follow a desired travel path so as to correctly position board end 24' by the time the board exits the downstream end of the fence.

If the appropriate step is step 30*c,* then positioner 28 is pivoted to align surface 28*b* of positioner 28 with step 30*c,* (the third vertical face), at the entrance end 30*c*' to step 30*c*. Thus the end 24' of a board 24 moving in direction A, urged in direction B, will slide over surface 28*b* and transition onto and along step 30*c,* sliding along the vertical wall so as to follow the desired travel path. As chain lugs 14*a* move board 24 along in direction A and ending rolls 26 urge board 24 in direction B, board end 24' follows along step 30*a,* 30*b* or 30*c*.

Figure 5:
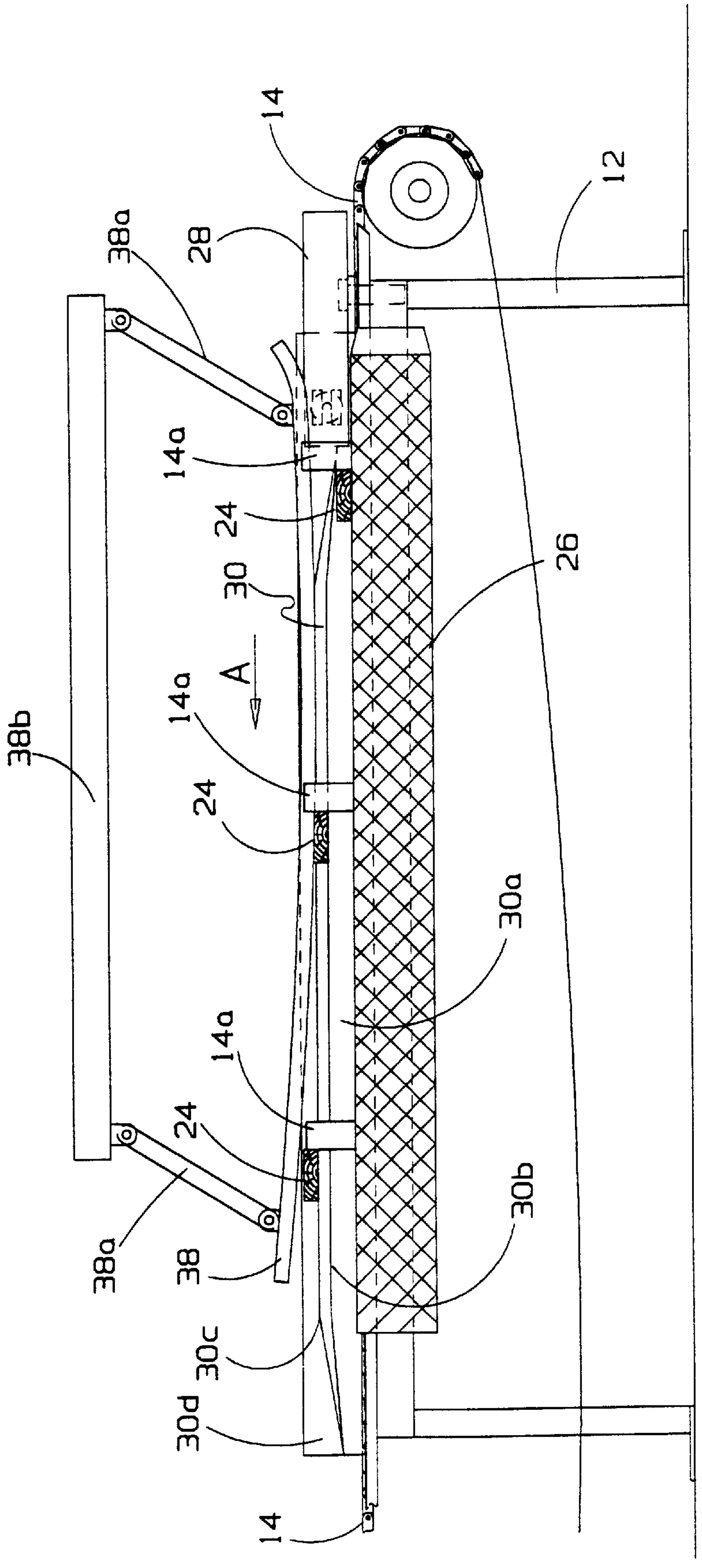
FIG. 5 is a cross-sectional view along section line 5—5 in FIG. 1.
Figure 6:
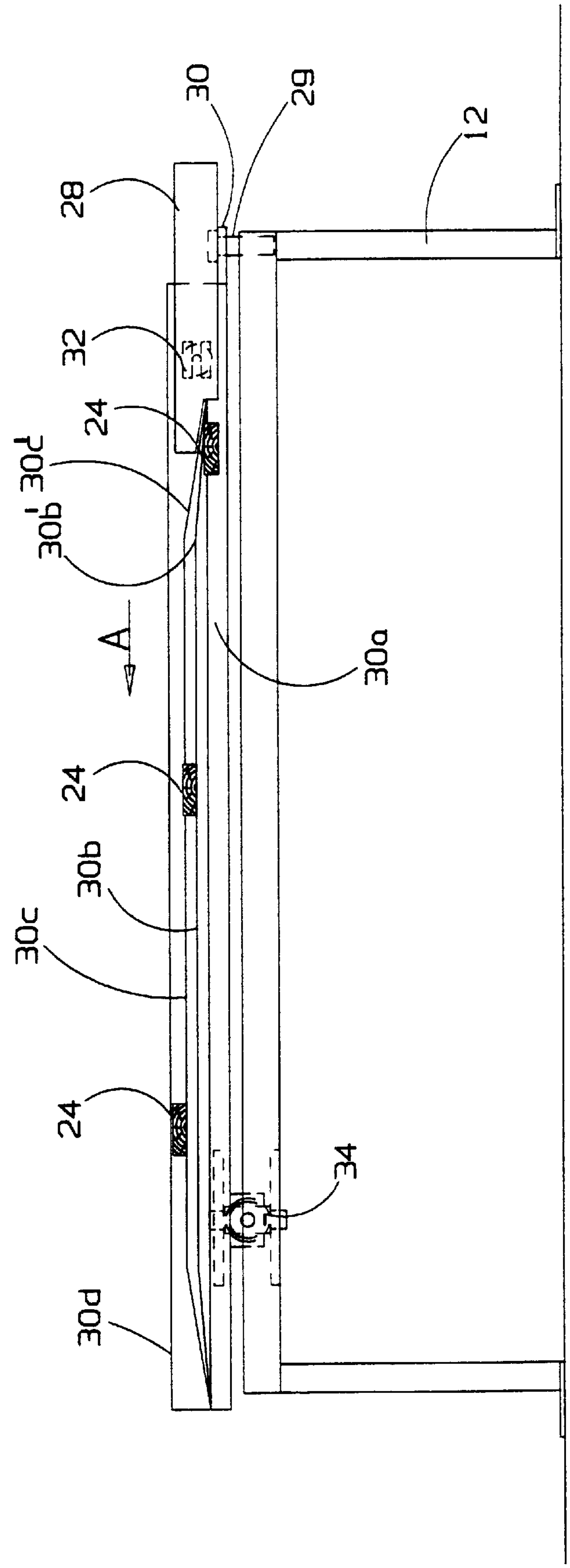
FIG. 6 is a cross-sectional view along section line 6—6 in FIG. 1.

As best seen in FIGS. 3 and 5, an overhead hold down 38 helps to insure that board 24 is held against ending rolls 26. Hold down 38 also helps to prevent board 24 from chattering endwise against fence 30. Thus board 24 stays snug against fence 30 until it reaches the downstream end of fence 30. Hold down 38 may be an elongate generally planar, advantageously ski-shaped, member pivoting downwardly, by pivot members 38*a,* under its own weight from overhead support 38*b*. The elevated or upwardly curved end of the ski-shaped member points upstream to capture boards 24 thereunder. Hold down 38 may be installed in skewed relation relative to parallel alignment with ending rolls 26 to assist urging boards against the fence as the boards translate towards the saws.

Figure 7:
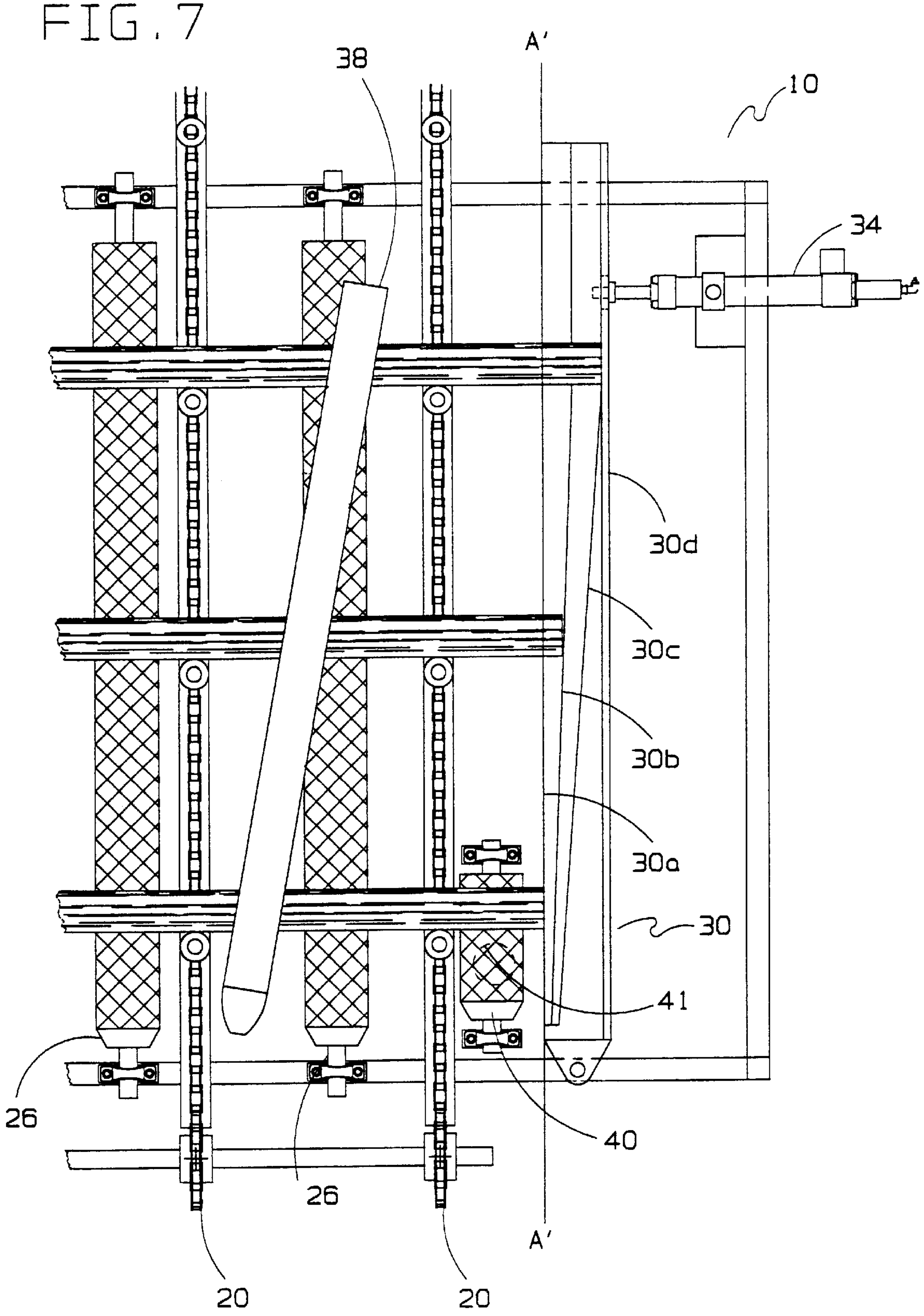
FIG. 7 is an enlarged view of an alternative board positioner.

As seen in FIG. 7, an alternative positioner directional roll 40, alternative to positioner 28, selectively directs board 24 to either fence step 30*b,* or 30*c* as required. Positioner directional roll 40 may be selectively incrementally elevated by a multi-stage cylinder 41 (seen in dotted outline in end-on view) so as to elevate a board 24 on roll 40 to a position corresponding in elevation to a desired step 30*b* or 30*c*. If the board 24 is to be positioned only a short lateral distance in direction B relative to line A'—A', then positioner directional roll 40 will not be elevated and roll 40 will remain below the level of boards 24 on ending rolls 26 and board 24 will be positioned by the first face 30*a* of stepped fence 30.

Figure 8:
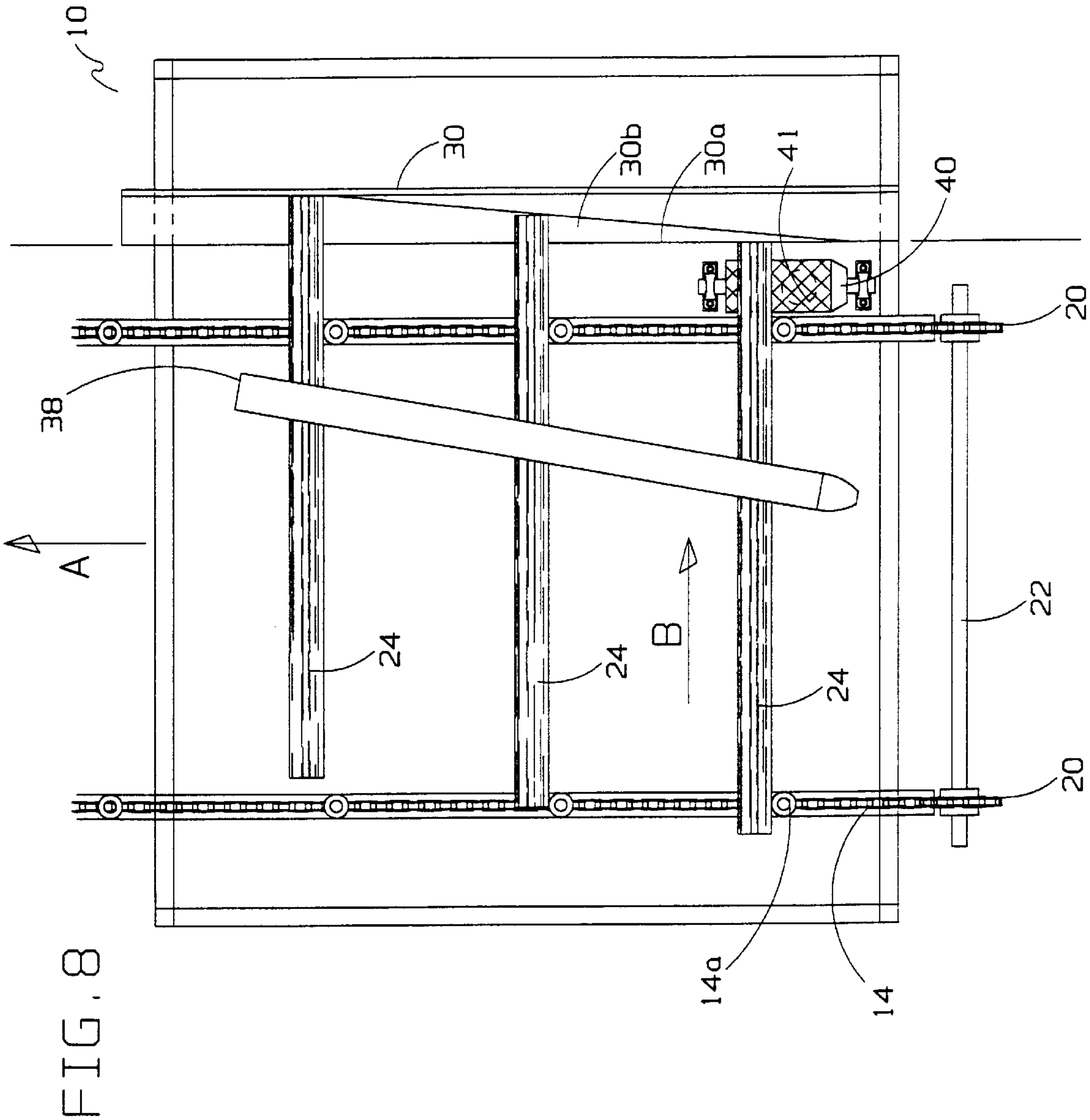
FIG. 8 is an enlarged view of a fixed stepped fence for sorting.

As best seen in FIG. 8, in an alternative embodiment for sorting usage, the positioning cylinder 34 of FIG. 7 is eliminated. Thus fence 30 fixed. Board 24 is directed on to step 30*b* by the elevation and actuation of positioner directional roll 40. Roll 40 is selectively elevated by cylinder 41. Otherwise board 24 follows first face 30*a* of stepped fence 30. If board 24 is raised by roll 40 and begins to follow step 30*b* of fence 30, board 24 falls below the chain run onto a conveyor (not shown) as board 24 is no longer supported by both lugged transfer chains 14. Multiple sort positions are possible in a fixed fence sorting usage so that boards of different lengths fall onto appropriate conveyors.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A board positioning device for selectively positioning in a lateral direction in a generally horizontal plane a board translating on board transfer chains in a longitudinal direction in said horizontal plane, wherein said board is aligned along its length in said lateral direction, said board positioning device comprising:

(a) a stepped fence lying in said generally horizontal plane said stepped fence having a plurality of adjacent terraced steps extending downstream from an upstream stepped fence entrance, in generally said longitudinal direction from said upstream stepped fence entrance whereat said board may be slid onto the step of said plurality of adjacent terraced steps, each step of said plurality of adjacent terraced steps defining a corresponding transition path for transitioning an end of said board from said upstream stepped fence entrance to a downstream position, (b) a board end placement means for selectively actuable placing of said end of said board onto a desired step of said plurality of adjacent terraced steps at said upstream stepped fence entrance so as to correctly position said end of said board at said downstream position.

2. The device of claim 1 wherein said selective positioning of said end of said board onto a desired step is in accordance with instructions from an optimizer, and said downstream position is an optimized board ending position optimized relative to at least one trimmer saw downstream of said stepped fence.

3. The device of claim 2 wherein said stepped fence is selectively positionable, independently of actuation of said board end placement means, in said lateral direction in said generally horizontal plane so as to position said one step of said plurality of adjacent terraced steps and said corresponding transition path so as to accurately optimize said optimized board ending position.

4. The device of claim 3 wherein said stepped fence is selectively positionable by means of a pivot mount on said stepped fence at an upstream end thereof, said stepped fence selectively pivotable about said pivot mount by means of a selective actuator mounted to said stepped fence at a position downstream of said pivot mount.

5. The device of claim 1 wherein said plurality of adjacent terraced steps is a generally radially spaced array radially spaced apart relative to said upstream stepped fence entrance.

6. The device of claim 1 further comprising a flexible overhead hold down.

7. The device of claim 6 wherein said overhead hold down is an elongate member lying in a generally horizontal plane and pivotally mounted on parellelogram linkage members to rigid overhead supporting members mounted over said board transfer chains, wherein said elongate member pivots under its own weight into downwardly compressive engagement with said board whereby said board is held down onto said board transfer chains by said elongate member.

8. The device of claim 7 wherein said elongate member is skewed in said generally horizontal plane relative to said lateral direction, an upstream end of said elongate member positioned a greater lateral distance from said stepped fence than a downstream end of said elongate member, whereby, in conjunction with said board ending means, said board is urged against said stepped fence as said board is translated longitudinally downstream.

9. The device of claim 8 wherein said elongate member is ski-shaped so as to have an upwardly curved tip at its upstream end, whereby said elongate member may ride up onto said board as said board is translated longitudinally downstream on said board transfer.

* * * * *